United States Patent [19]
Brown et al.

[11] Patent Number: 5,596,495
[45] Date of Patent: Jan. 21, 1997

[54] GEARSHIFT CONTROLLER FOR AUTOMATIC TRANSMISSION

[75] Inventors: Larry T. Brown; Marvin P. Kraska, both of Dearborn, Mich.

[73] Assignee: Ford Motor Company, Dearborn, Mich.

[21] Appl. No.: 468,851

[22] Filed: Jun. 6, 1995

[51] Int. Cl.$^6$ ............... B60K 41/22; F16H 61/06
[52] U.S. Cl. ............... 364/424.08; 477/144; 477/148; 477/158
[58] Field of Search ............... 364/424.1, 426.01; 192/3.51, 3.58; 74/336 R, 333; 477/117, 120, 121, 123, 127, 132, 144, 149, 154, 155, 158, 161

[56] References Cited

U.S. PATENT DOCUMENTS

| | | | |
|---|---|---|---|
| 4,527,678 | 7/1985 | Pierce et al. | 192/3.58 |
| 4,653,351 | 3/1987 | Downs et al. | 477/148 |
| 4,955,259 | 9/1990 | Narita | 477/161 |
| 4,970,916 | 11/1990 | Narita | 477/131 |
| 5,046,178 | 9/1991 | Hibner et al. | 364/424.1 |
| 5,081,887 | 1/1992 | Kato | 364/424.1 |
| 5,134,904 | 8/1992 | Minagawa | 477/120 |

*Primary Examiner*—Kevin J. Teska
*Assistant Examiner*—Tan Nguyen
*Attorney, Agent, or Firm*—Frank G. McKenzie

[57] ABSTRACT

A system for controlling a downshift in an automatic transmission having a torque converter includes friction elements for alternately producing a drive connection between components of a planetary gear set and disengaging the connection, a valve body adapted to connect a source of high pressure hydraulic fluid to the friction elements, a solenoid for controlling operation of the hydraulic valves, a microprocessor having a memory containing control algorithms, sensors producing signals representing the speed of the transmission output shaft and turbine shaft, a sensor producing a signal representing the position of an engine throttle, the control algorithms controlling a downshift of the transmission.

9 Claims, 3 Drawing Sheets

GEARSHIFT CONTROLLER FOR AUTOMATIC TRANSMISSION

BACKGROUND OF THE INVENTION

1. Field of the Invention

This invention pertains to the field of automatic transmission controls.

2. Description of the Prior Art

Automatic transmissions for motor vehicles generally include multiple planetary gear sets, each including a sun gear, a ring gear surrounding the sun gear, and a set of planet pinions in continual meshing engagement with the ring gear and sun gear and supported for rotation on a carrier. Gear ratio changes are made by disengaging a drive connection among the elements of the gear sets that produce a first speed ratio and connecting other components of the gear sets that produce another gear ratio. Hydraulically actuated friction clutches and brakes are employed to releasably connect the drive connections among the components of the gear sets. The friction elements are engaged by supplying pressurized hydraulic fluid to the friction element; the drive connections are disengaged by either venting the friction elements or reducing the pressure in the friction element to such a low magnitude that the friction element has no capacity to transmit torque from its input to its output.

One-way clutches have been used in automatic transmissions in order to avoid the complexity during a gear ratio change of disengaging one friction element and concurrently engaging another friction element. Depending on whether the gear ratio change is an upshift or downshift, the one-way clutch holds then releases or overruns during the period when the oncoming friction element is being pressurized and engaged to complete the new driving connection among the components of the gear sets that produce the new gear ratio.

If the one-way clutch can be eliminated from an automatic transmission, its cost and weight and size can be reduced. However, removing one-way clutches has the potential to degrade the quality of the gear ratio changes, especially during coast-down gearshifts.

If a standard coast-down shift from the third to first speed ratio is attempted during a synchronous gearshift, i.e., one in which the offgoing friction element and oncoming friction element are engaged and released concurrently, a large output shaft torque disturbance results as the drive wheels of the vehicle are connected to the engine if a one-way clutch is not employed.

SUMMARY OF THE INVENTION

To prevent a torque disturbance of this kind, a controller has been configured and implemented to control gear ratio changes. The control strategy determines the transmission turbine speed at the start of a commanded gearshift, e.g., a three-one coast-down shift. The turbine speed is held constant as the shift is executed. In order to hold turbine speed at the commanded speed as the transmission output speed decreases during the shift, the speed ratio of the transmission is changed automatically over a longer period of time than normally required. If hard braking is incurred, the transmission speed ratio changes faster as the output speed decreases more rapidly.

An object of the present invention is to provide an active control technique resulting in shift quality approaching that of a nonsynchronous shift control involving use of one-way clutches. An advantage of the present invention is that the cost and weight of the automatic transmission can be reduced substantially in comparison to those of automatic transmissions that contain one-way clutches In realizing these objects and advantages the method, according to the present invention, for controlling a change from a first gear to a second gear in an automatic transmission having an input shaft, output shaft, gearing driveably connecting the input shaft and output shaft, an oncoming friction element and offgoing friction element, includes the steps of repetitively determining current input shaft speed and output shaft speed; determining an initial speed ratio from the input shaft to the output shaft while operating in the first gear; repetitively determining a speed ratio from the input shaft to the output shaft during the change in gears; increasing speed ratio by decreasing pressure in the offgoing friction element and increasing pressure in the oncoming friction element; determining the magnitude of initial input shaft speed when speed ratio has reached a predetermined magnitude above the initial speed ratio; reducing pressure in the offgoing friction element substantially to zero pressure; repetitively producing a commanded speed ratio determined from said initial input shaft speed and current output shaft speed; and increasing speed ratio continually by controlling the magnitude of pressure in the oncoming friction element under control of a closed-loop controller until speed ratio reaches a target speed ratio.

DETAILED DESCRIPTION OF THE PREFERRED EMBODIMENT

Figure 1:
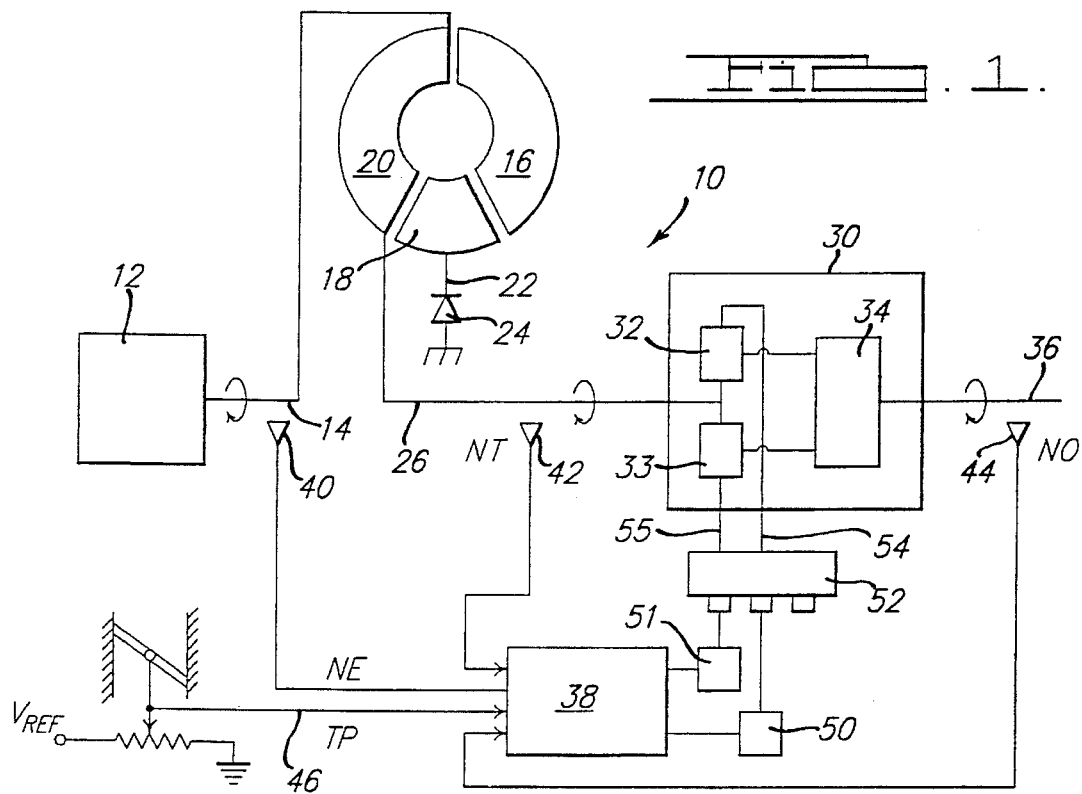
FIG. 1 is a schematic diagram of a powertrain to which the control of the present invention can be applied.

Referring first to FIG. 1, the powertrain 10 includes an IC engine 12 whose crankshaft 14 is driveably connected to the impeller wheel 16 of a torque converter 18, having a turbine wheel 20 adapted for hydrokinetic connection to the impeller and a stator wheel 22 supported rotatably on the transmission casing by a one-way clutch 24. The turbine shaft 26 is driveably connected to the input shaft of a transmission 30, which includes hydraulically actuated friction clutches and/or brakes 32, 33, whose engagement and disengagement alter the speed ratio produced by a gear set 34. The transmission has an output shaft 36 driveably connected to the drive wheels of the vehicle.

A shift control unit in the form of an electronic microprocessor or microcontroller 38 has input ports connected to various shaft speed sensors, including engine speed sensor 40, which produces a signal representing the speed NE of the engine; sensor 42, which produces a signal representing the speed of the turbine shaft NT; and sensor 44, which produces a signal representing the output shaft speed NO. A signal representing the position of a throttle pedal or throttle position TP, which controls engine manifold conditions, is carried on line 46 to the microprocessor 38. Output shaft speed NO is proportional to vehicle speed.

Output signals produced by the shift control unit 38 are carried to variable force solenoids or pulse width modulated solenoids 50, 51. Valve body 52 contains shift control valves that open and close communication between a fluid pressure source and the friction elements in response to the signals applied to the solenoids. As the valves open and close, hydraulic lines 54, 55 are supplied with pressurized fluid or vented, thereby engaging and disengaging the oncoming and offgoing friction elements 32, 33, whose operating states determine the speed ratio produced by the gear set 34.

Generally, an automatic transmission produces a gear ratio change by venting hydraulic pressure supplied to an offgoing friction element and pressurizing the oncoming friction element. The torque capacity of the offgoing friction element is reduced during this process and the torque capacity of the oncoming friction element is increased during the shift, as explained below with reference to FIG. 2.

U.S. Pat. No. 4,938,097, owned by the assignee of the present invention, describes an automatic transmission, friction clutches, brakes, gear set and one-way clutch operative during coast braking conditions. The transmission described in that patent is an example of the transmission 30.

Figure 4:
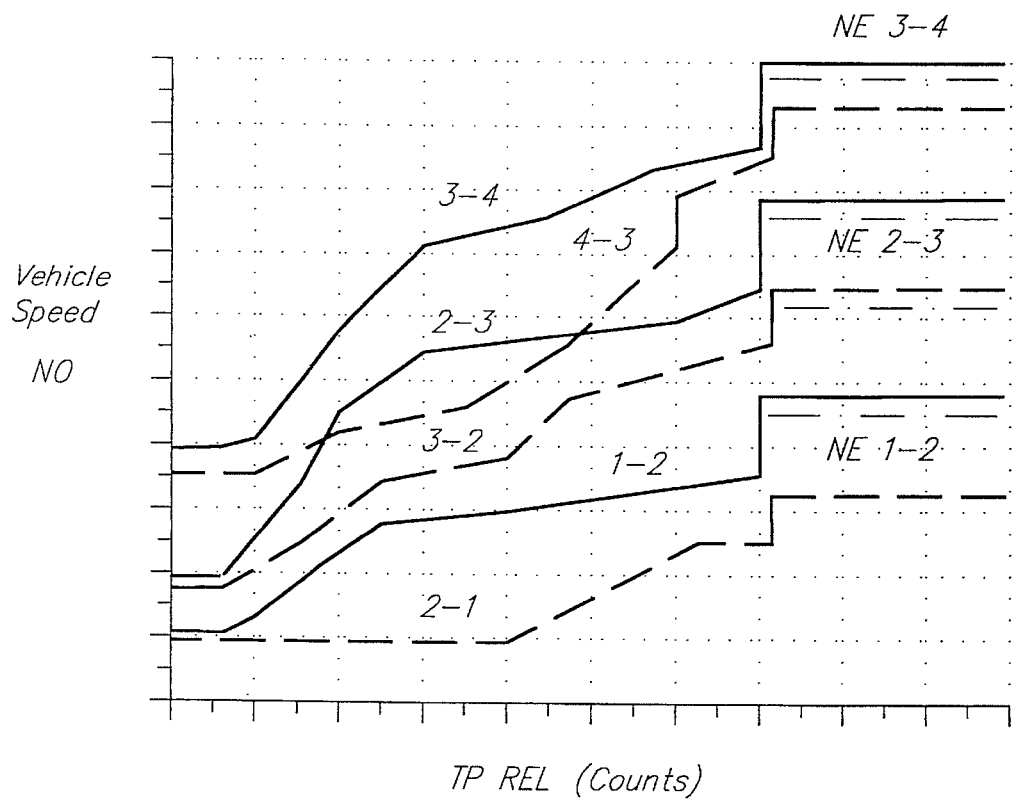
FIG. 4 is a schedule of vehicle operating conditions that determine where upshifts and downshifts are commanded in an electronically controlled automatic transmission.

FIG. 4 shows gear ratio boundaries defined in terms of vehicle speed VS, engine speed NE, and throttle position TP REL. FIG. 4 shows where the gear ratio changes, both upshifts and downshifts, are scheduled to occur automatically among the forward gear ratios produced by the transmission. The data of FIG. 4 are stored in read-only-memory ROM in the form of a look-up table. The lines marked 1-2, 2-3, 3-4 define where upshifts occur, and lines 2-1, 3-2, 4-3 define where downshifts occur. At the right-hand end of the throttle position range, upshifts occur when engine speed has the values NEX-X, where X-X represents the gear ratio change.

A signal indicating each commanded gear ratio is produced, according to the schedule of FIG. 4, by the shift control unit 38 using throttle position TP, vehicle speed VS, and engine speed as input. If the operating condition represented by vehicle speed and throttle position or by engine speed and throttle position crosses an upshift or downshift line, and the new speed ratio requires a change in the state of friction elements 32, 33, the output signals to solenoids 50, 51 cause a change in the state of solenoids 50, 51 and a change in the gear ratio to the commanded gear ratio.

As NO, NE, and TP REL change during vehicle operation in a particular gear ratio such that a line of FIG. 4 is crossed during execution of engine and transmission control algorithms from an operating condition defined by these variables during a previous execution of control algorithms, need for a gear ratio change is indicated following a comparison of the desired gear ratio from FIG. 4 and the current gear ratio. For example, if the current operating condition passes from above the 4-3 line to below that line, a gear shift from fourth gear to third gear is commanded because of the inequality between the fourth gear ratio and the desired gear ratio from the schedule, provided other criteria considered by the control so permit. Similarly, upshifts may be commanded when the current operating condition passes through an upshift line, a solid line of FIG. 4. When the operating condition during execution of the control algorithms is located in the zone between adjacent upshift and downshift lines, no gear ratio change is commanded.

Figure 2:
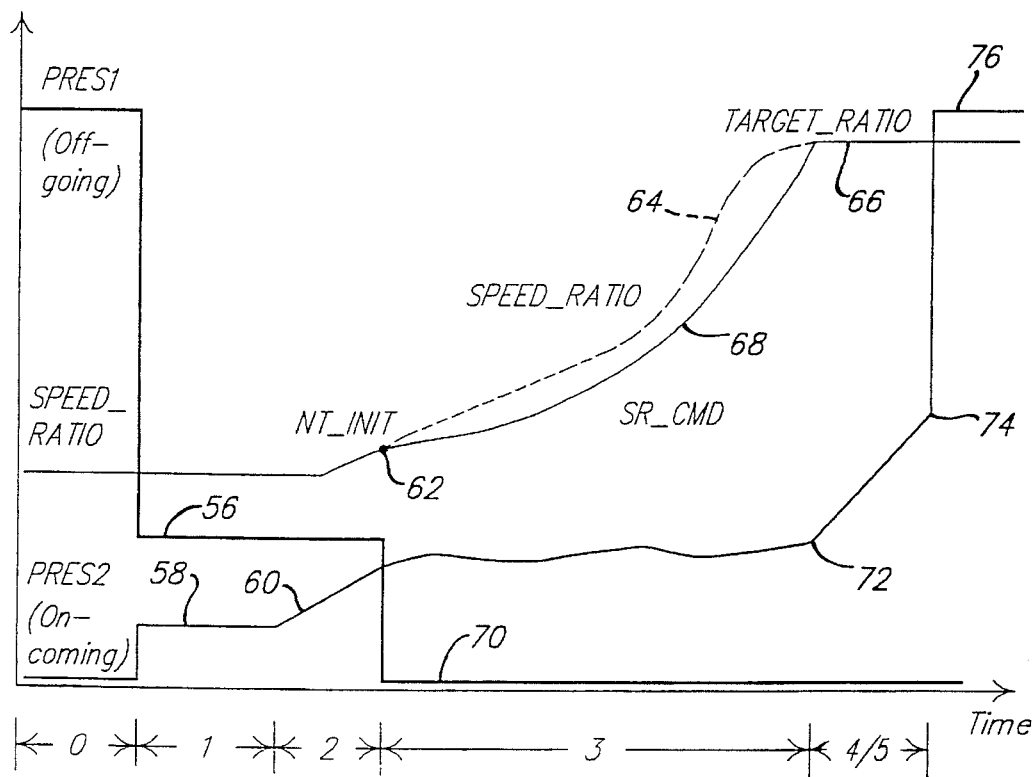
FIG. 2 is a graph representing friction element pressures and speed ratio during a gearshift controller according to the present invention.

Referring now to FIG. 2, before a downshift occurs from third speed ratio to first speed ratio, controlled according to the present invention, the offgoing friction element is supplied with high pressure PRES1, and the oncoming friction element is vented or is at low pressure PRES2. After the shift control unit 38 issues a signal representing a new commanded speed ratio, the solenoid that controls the offgoing friction element cause a pressure reduction to pressure 56, a magnitude sufficient to barely hold the transmission in the third speed ratio, and the oncoming friction element pressure is increased slightly to magnitude 58, thereby stroking the oncoming friction element to take up clearances and to maintain its torque capacity slightly below the pressure that would cause the oncoming friction element to transmit any torque.

After these actions are taken, PRES2 is increased linearly on a ramp 60, thereby increasing the torque capacity of the oncoming friction element, while holding PRES1 at the magnitude 56. These action cause SPEED RATIO, i.e., NT/NO, to rise slightly to a magnitude NT INIT 62. The value NT INIT is recorded and stored in an electronic memory accessible to the microprocessor.

Figure 3:
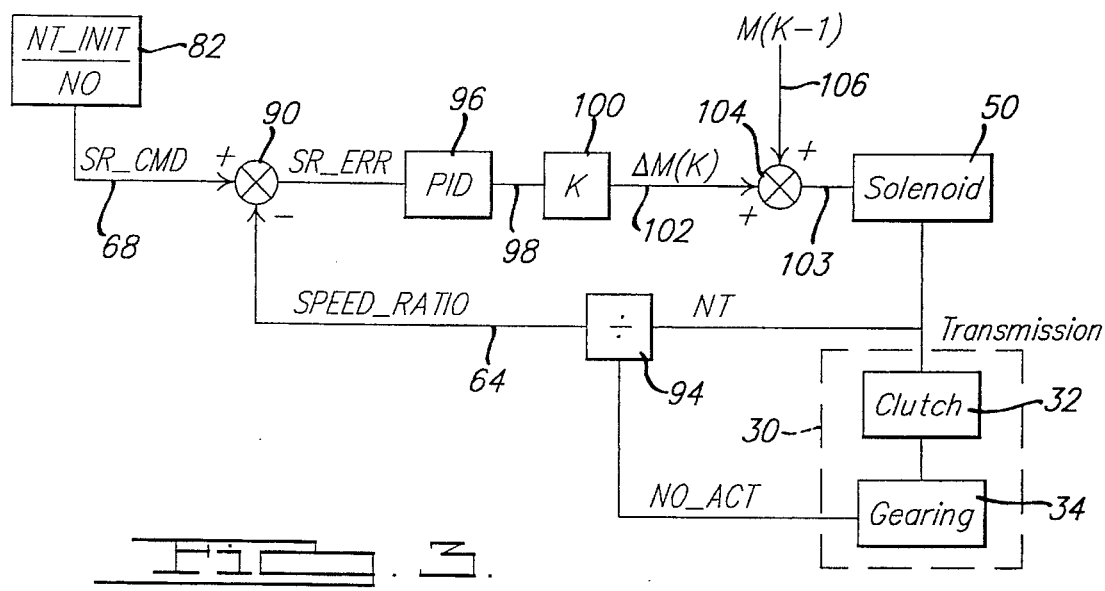
FIG. 3 is a schematic diagram illustrating a feedback controller suitable for use with this invention.

After SPEED RATIO rises to NT INIT 62, the control enters a third phase, during which a feedback control, described below with reference to FIG. 3, causes SPEED RATIO to rise to the TARGET RATIO 66 in response to a signal SR CMD, the commanded speed ratio signal. To accomplish this result, PRES1 is reduced abruptly to magnitude 70, where the torque capacity of the offgoing friction element is substantially zero, PRES2 varies until the SPEED RATIO rises to TARGET RATIO 66, at which point PRES2 reaches the magnitude 72.

Under conventional control, SR CMD rises rapidly and linearly with time in order to complete the gear ratio change within a predetermined time, approximately 0.5 seconds. Here, preferably SR CMD extends the gear ratio change so that engine acceleration is not felt or perceived by the vehicle operator. During the third control phase, vehicle speed NO approaches zero, so SR CMD rises in proportion to engine braking. By holding turbine speed NT constant during this phase, engine braking is held to a minimum, i.e., the negative torque of the engine is a minimum as it would be during the operation of a one-way clutch, such as described in the above referenced U.S. Pat. No. 4,938,097.

After TARGET RATIO is reached, PRES2 increases linearly to a magnitude 74 while TARGET RATIO is maintained constant. Thereafter, PRES2 is increased abruptly to magnitude 76 so that the oncoming friction element has sufficient torque capacity required for first gear ratio operation, i.e., the torque capacity when relatively high line pressure is supplied to the oncoming friction element.

Data samples are recorded at 16 msec. intervals during a mid-ground or repeater loop, during which the control algorithms are executed. The microprocessor is equipped with a timer, a counter whose output is represented by COUNT, a memory containing various calibration constants and algorithms, and flags representing the phase of the control represented in FIG. 2.

Figure 5:
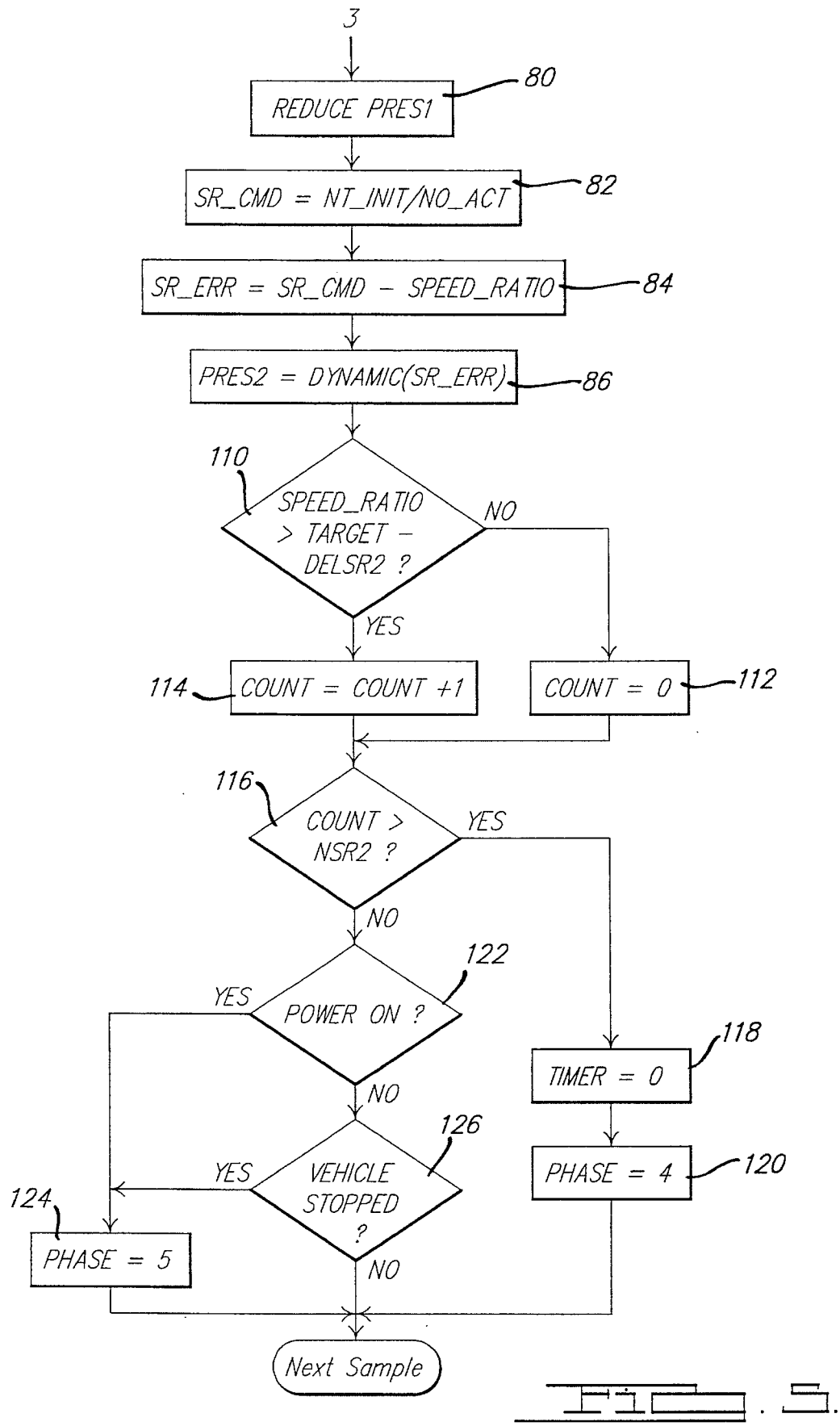
FIG. 5 is a diagram of logic used to control operation of a transmission according to the present invention.

Turning now to the diagram of FIG. 5, which represents the logic that controls the third, phase of the engagement of the oncoming friction element and disengagement of the offgoing friction element, after NT INIT is stored in memory, the offgoing friction element pressure PRES1 is reduced 80, either by venting that friction element or reducing its pressure to slightly below the pressure at which the friction element carries torque, i.e., the stroke position at which the friction element is filled with hydraulic fluid and ready to transmit torque between its input and output members. At 82 the commanded speed ratio is determined from NT INIT/NO ACT, the ratio of the turbine speed at point 62 to the current output shaft speed. Next, at 84, a speed ratio error SR ERR is determined as the difference between the commanded speed ratio and the current speed ratio.

Block 86 represents the method for determining the pressure of the ongoing friction element controlled through operation of a downshift controller, such as that described next with reference to FIG. 3. The commanded speed ratio SR CMD, calculated as described above with reference to block 82, is carried on line 68 to summing junction 90, where it is combined with the actual speed ratio, carried on line 64 from divider 94, to produce speed ratio error SR ERR. At divider 94, turbine speed NT is divided repeatedly by the actual output shaft speed NO.

The speed ratio error is carried to a PID controller 96, whose output on line 98 is operated on by gain 100. An incremental solenoid duty cycle is carried on line 102 to summing junction 104. The duty cycle is the signal applied to the solenoid that controls operation of the ongoing clutch 32. The most recent duty cycle applied to the relevant solenoid is carried on line 106 to summing junction 104 where the duty cycles are added. The output of junction 104 is carried on line 103 to solenoid 50. Transmission 30 contains a valve body 52 having shift control valves that open and close a source of regulated hydraulic pressure to the oncoming clutch 32 in response to the duty cycle applied to the solenoid through operation of the feedback control of FIG. 3. The actual speed ratio 64 is summed with the commanded speed ratio 68. Closed loop control, as in block 86, is maintained throughout phase 3 (FIG. 2) from NT INIT 62 to TARGET RATIO 66.

Returning now to FIG. 5, an inquiry is made at 110 to determine whether the actual speed ratio is within a reference range, i.e., TARGET RATIO minus a calibration constant DELSR2. If the actual speed ratio is not within the reference range, a counter is initialized at 112. If, however, the actual speed ratio is within the range, indicating that the actual speed ratio is below but approaching and near to the target speed ratio, the current value COUNT is incremented at 114. When the count of consecutive samples with the speed ratio near the target speed ratio and within the reference range reaches a predetermined value NSR2, the comparison at 116 becomes true, TIMER is initialized at 118, and control passes to 120 for a fourth phase of control discussed above with reference to FIG. 2. During the fourth phase of control, the speed ratio change is terminated normally so that PRES2 ramps up from 72 to 74 without regard to the operating state of the transmission or vehicle and under control of an open loop ramp control.

If, however, the comparison at 116 is false, an inquiry is made at 122 to determine whether the current gearshift is a power-on gearshift, by testing whether the state of the throttle pedal is relaxed. If the gear ratio change is under power-on conditions, control passes to 124 where the shift is completed during a fifth phase of control. If the inquiry at 122 is false, an inquiry is made at 126 to determine, with reference to the magnitude of the output shaft speed NO, whether the vehicle is stopped. If the vehicle is stopped, control passes to 124; if the vehicle is not stopped the algorithm is executed again to acquire updated sample data every 16 msec.

Phase five, an alternate method for ending the gearshift, terminates the gear ratio change independently of the speed ratio, and it can accommodate a power-on condition. If the vehicle is stopped, torque converter torque is used to relate pressure PRES2 to the magnitude of oncoming friction element torque.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. A method for controlling a change from a first gear to a second gear in an automatic transmission having an input shaft, output shaft, gearing driveably connecting the input shaft and output shaft, an oncoming friction element and offgoing friction element, comprising the steps of:

repetitively determining current input shaft speed and output shaft speed;

determining an initial speed ratio from the input shaft to the output shaft while operating in the first gear;

repetitively determining a speed ratio from the input shaft to the output shaft during the change in gears;

increasing speed ratio by decreasing pressure in the offgoing friction element and increasing pressure in the oncoming friction element;

determining the magnitude of initial input shaft speed when speed ratio has reached a predetermined magnitude above the initial speed ratio;

reducing pressure in the offgoing friction element substantially to zero pressure;

repetitively producing a commanded speed ratio determined from said initial input shaft speed and current output shaft speed; and increasing speed ratio continually by controlling the magnitude of pressure in the oncoming friction element under control of a closed-loop controller until speed ratio reaches a target speed ratio.

2. The method of claim 1 wherein the step of increasing speed ratio by decreasing pressure in the offgoing friction element further comprises:

decreasing offgoing friction element pressure to a magnitude slightly above the pressure required to operate the transmission in the first gear;

increasing pressure in the oncoming friction element to a magnitude slightly below that required to transmit torque through the oncoming friction element; and increasing oncoming friction element pressure substantially linearly so that speed ratio increases.

3. The method of claim 1 further comprising increasing pressure in the oncoming friction element to a magnitude sufficient to fully engage said friction element.

4. The method of claim 3, further comprising changing the magnitude of the signal supplied to the solenoid after the actual speed ratio reaches the target speed ratio such that the oncoming friction element is full engaged.

5. The method of claim 1 for use in a transmission that is includes a solenoid-operated shift valve through which the oncoming friction element is engaged and disengaged in response to a signal applied to the solenoid, wherein the step of increasing speed ratio by controlling the magnitude of pressure in the oncoming friction element further comprises:

controlling the magnitude of the signal supplied to the solenoid on the basis of a speed ratio error representing a difference between commanded speed ratio and speed ratio.

6. The method of claim 1 for use in a transmission that includes a solenoid-operated shift valve through which the oncoming friction element is engaged and disengaged in response to a signal applied to the solenoid, wherein the step of increasing speed ratio by controlling the magnitude of pressure in the oncoming friction element further comprises:

repetitively comparing actual speed ratio and commanded speed ratio and producing a speed ratio error from said comparison;

producing from the speed ratio error a commanded signal magnitude to be applied to said solenoid;

repetitively comparing the commanded signal magnitude and current signal magnitude and producing a signal magnitude error from said comparison;

producing a signal magnitude error representing the difference between and the commanded duty cycle; and applying the signal magnitude error to the solenoid.

7. A method for controlling, with the aid of an electronic computer, a change from a first gear to a second gear in an automatic transmission having an input shaft, output shaft, gearing driveably connecting the input shaft and output shaft, an oncoming friction element and offgoing friction element, and a solenoid-operated shift valve for controlling engagement and disengagement of the oncoming friction element responsive to the magnitude of a signal applied to the solenoid, comprising the steps of:

repetitively determining current input shaft speed and output shaft speed;

determining an initial speed ratio from the input shaft to the output shaft while operating in the first gear;

repetitively determining a speed ratio from the input shaft to the output shaft during the change in gears;

increasing speed ratio by decreasing pressure in the offgoing friction element and increasing pressure in the oncoming friction element;

determining and storing in electronic memory accessible to the computer the magnitude of initial input shaft speed when speed ratio has reached a predetermined magnitude above the initial speed ratio;

providing the computer with a data base including a target speed ratio and a closed-loop controller adapted to increase speed ratio continually.

8. The method of claim 7 wherein the step of increasing speed ratio continually by applying to the solenoid the signal produced by the closed-loop controller until speed ratio reaches said target speed ratio, further comprises:

repetitively comparing actual speed ratio and commanded speed ratio and producing a speed ratio error from said comparison;

producing from the speed ratio error a commanded signal magnitude to be applied to said solenoid;

repetitively comparing the commanded signal magnitude and current signal magnitude and producing a signal magnitude error from said comparison;

producing a signal magnitude error representing the difference between and the commanded duty cycle;

applying the signal magnitude error to the solenoid.

9. A system for controlling a change from a first gear to a second gear in an automatic transmission, comprising:

an input shaft and output shaft;

first and second speed sensors for sensing and producing an output representing the rotational speed of the input shaft and output shaft, respectively;

multiple speed gearing driveably connecting the input shaft and output shaft;

an oncoming friction element and offgoing friction element;

a memory containing a shift control schedule; and means for:

repetitively determining current input shaft speed and output shaft speed;

determining an initial speed ratio from the input shaft to the output shaft while operating in the first gear;

repetitively determining a speed ratio from the input shaft to the output shaft during the change in gears;

increasing speed ratio by decreasing pressure in the offgoing friction element and increasing pressure in the oncoming friction element;

determining the magnitude of initial input shaft speed when speed ratio has reached a predetermined magnitude above the initial speed ratio;

reducing pressure in the offgoing friction element substantially to zero pressure;

repetitively producing a commanded speed ratio determined from said initial input shaft speed and current output shaft speed; and increasing speed ratio continually by controlling the magnitude of pressure in the oncoming friction element under control of a closed-loop controller until speed ratio reaches a target speed ratio.

\* \* \* \* \*